United States Patent
Ramanathan

(10) Patent No.: US 7,962,916 B2
(45) Date of Patent: Jun. 14, 2011

(54) METHOD OF DISTRIBUTING LOAD AMONGST TWO OR MORE COMPUTER SYSTEM RESOURCES

(75) Inventor: Krishnan Ramanathan, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 1835 days.

(21) Appl. No.: 11/098,830

(22) Filed: Apr. 5, 2005

(65) Prior Publication Data

US 2005/0240935 A1    Oct. 27, 2005

(30) Foreign Application Priority Data

Apr. 7, 2004    (GB) .................................. 0407893.7

(51) Int. Cl.
*G06F 9/46*    (2006.01)
(52) U.S. Cl. ...................................................... 718/105
(58) Field of Classification Search ................... 718/105, 718/102, 104; 707/2
See application file for complete search history.

(56) References Cited

U.S. PATENT DOCUMENTS

| | | | |
|---|---|---|---|
| 6,918,117 B2 * | 7/2005 | Mayfield ....................... | 718/105 |
| 7,146,353 B2 * | 12/2006 | Garg et al. ...................... | 707/2 |
| 7,322,033 B2 * | 1/2008 | Ito ................................... | 718/104 |
| 7,526,765 B2 * | 4/2009 | Lin et al. ........................ | 718/102 |
| 7,770,175 B2 * | 8/2010 | Flockhart et al. ............. | 718/105 |
| 2002/0194335 A1 | 12/2002 | Maynard | |

FOREIGN PATENT DOCUMENTS

GB    2363952 A    1/2002

OTHER PUBLICATIONS

Ferri, Richard, "The Secrets of openMosix", http://www.samag.com/document/s=8817/sam0313a/0313a.htm, Apr. 6, 2005.
"OpenSSI (Single System Image) Clusters for Linux", http://openssi.org/cgi-bin/view?page=openssi.html, Apr. 6, 2005.
Garg, Pankaj K., et al., "Web Transaction Analysis and Optimization (TAO)", Software Technology Laboratory, HP Laboratories, Palo Also, CA, Mar. 4, 2002, pp. 1-20.
"TeamQuest White Papers", http://www.teamquest.com/cgi-bin/teamquest/resources/wp.pl?do=wp&id=cp, Apr. 6, 2005.
"How to Do Capacity Planning", Teamquest Corporation, White Paper, TQ-WP23 Rev. B, 2003.
List of Papers found on website: http://www.2.cs.cmu.edu/~harchol/Papers/papers.html, Apr. 6, 2005, 4 pages.

* cited by examiner

*Primary Examiner* — Meng A An
*Assistant Examiner* — Eric C Wai

(57) ABSTRACT

A method of distributing load amongst two or more computer system resources. The method includes distributing load to the system resources in accordance with their modeled response times and a predetermined Service level Agreement (SLA) associated with each system resource. By modeling the response time of each resource, load can be distributed with a view to maintaining response times within a predetermined Service level Agreement (SLA). The response time may be modeled by analytical modeling, which uses a queuing network model for predicting the response time, typically along with other parameters such as, utilization, throughput and queue length.

16 Claims, 2 Drawing Sheets

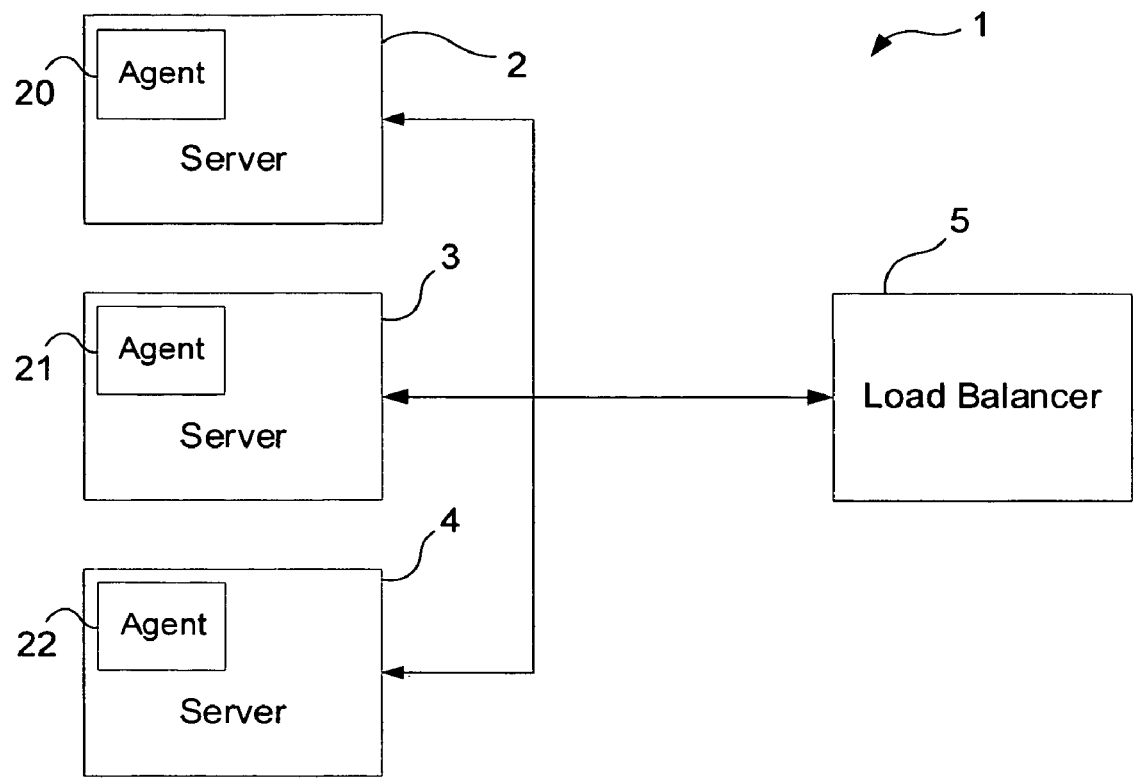
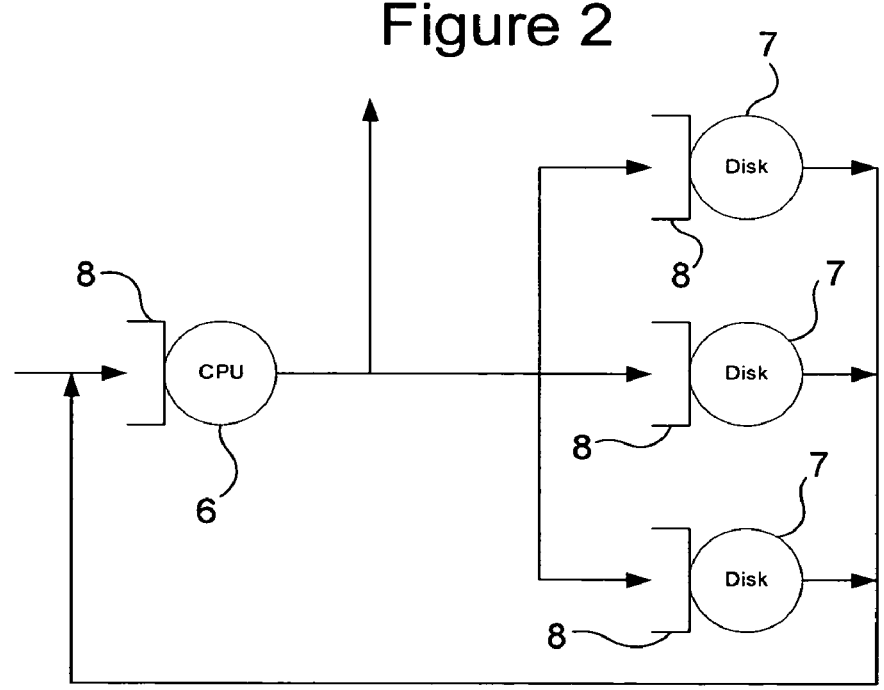

METHOD OF DISTRIBUTING LOAD AMONGST TWO OR MORE COMPUTER SYSTEM RESOURCES

FIELD OF THE INVENTION

The present invention relates to a method of distributing load amongst two or more computer system resources.

BACKGROUND OF THE INVENTION

Load balancing is used to distribute load among compute servers to ensure that no one server is overloaded. There are basically two categories of load balancing techniques: static and dynamic.

In static load balancing, a fixed technique is used to distribute the load. Examples are round robin techniques where the next transaction is allocated in round robin fashion to the servers. These techniques do not take into account the variation in the requests and the different loads therein.

In dynamic load balancing, the state of the system is taken into account when scheduling the next transaction. Most of the measures are performance measures (like CPU utilization) or the number of requests being currently served by an application.

An example of a previous load balancing technique is given in "The Case for SRPT Scheduling in Web Servers", Mor Harchol-Balter, Mark Crovella, SungSim Park, MIT-LCS-TR-767, October 1998, available online at cs.cmu.edu/~harchol/Papers/papers.html The assumption in previous load balancing techniques is that all the servers in the load balanced pool are of the same type. If this is not the case, it is difficult to load balance using performance measures that are not normalized. For instance, a high end server with 95% CPU utilization may be able to serve a request faster compared to a low end server with 80% CPU utilization.

Service Level Agreements (SLAs) are commonly provided which determine a minimum level of service to be provided by a computer system. Each SLA will include a maximum response time which is permitted under the SLA.

An object of the invention is to provide an alternative load balancing technique which takes resource response times into account in order to comply with SLAs.

SUMMARY OF THE INVENTION

The invention provides a method of distributing load amongst two or more computer system resources, the method including distributing load to the system resources in accordance with their modeled response times and in accordance with a predetermined Service Level Agreement (SLA) associated with each system resource.

The invention also provides a load distributor configured to distribute load amongst two or more computer system resources by this method. The load distributor may be provided in a load balancer, in cluster software, in a computational grid in which servers loan free CPU cycles, or in any other suitable computer system environment.

By modeling the response time of each resource, load can be distributed with a view to maintaining response times within the predetermined SLA.

In a preferred embodiment the load is distributed amongst the system resources in accordance with the difference between their modeled response times and their predetermined Service Level Agreements (SLAs). This enables the method to take into account a request which does not have the same SLA for each resource.

Typically the response time is modeled by analytical modeling, which uses a queuing network model for predicting the response time, typically along with other parameters such as, utilization, throughput and queue length. This enables the method to take into account queues that are forming in the system. An online book of queuing theory modeling for computer systems can be found in the text book "Quantitative system performance: computer system analysis using queuing network models", by Edward D. Lazowska et al, Prentice Hall, Inc, 1984, ISBN 0-13-746975-6, also available at cs.washington.edu/homes/lazowska/qsp/. However other ways of obtaining response time may be used, for example by simulation.

The computation is usually done in iterative fashion, calculating queues at each iteration. This is not only at the server level but can also be at an application level.

For example, in the Apache server, a master process receives all the requests and forks child processes to service the requests. Queues could form at the master process. Such queues can be modeled after understanding the application architecture.

In a preferred embodiment the modeling is performed by running a Mean Value Analysis (MVA) algorithm.

Typically the method includes receiving a request; receiving modeled response times for each system resource for processing the request; selecting one of the system resources in accordance with their modeled response times and in accordance with their predetermined Service Level Agreements (SLAs); and distributing the request to the selected system resource.

The invention further provides a computer system including two or more system resources, two or more agents each configured to model the response time of a respective system resource; and a load distributor configured to receive modeled response times from the agents and distribute load to the system resources in accordance with their respective modeled response times and in accordance with a predetermined Service Level Agreement (SLA) associated with each system resource.

BRIEF DESCRIPTION OF THE DRAWINGS

Embodiments of the invention will now be described, by way of example only, with reference to the accompanying drawings in which:

FIG. 1 is a schematic diagram of a computer network;
FIG. 2 is a schematic diagram of a server.

DETAILED DESCRIPTION OF THE PREFERRED EMBODIMENTS

Figure 3:
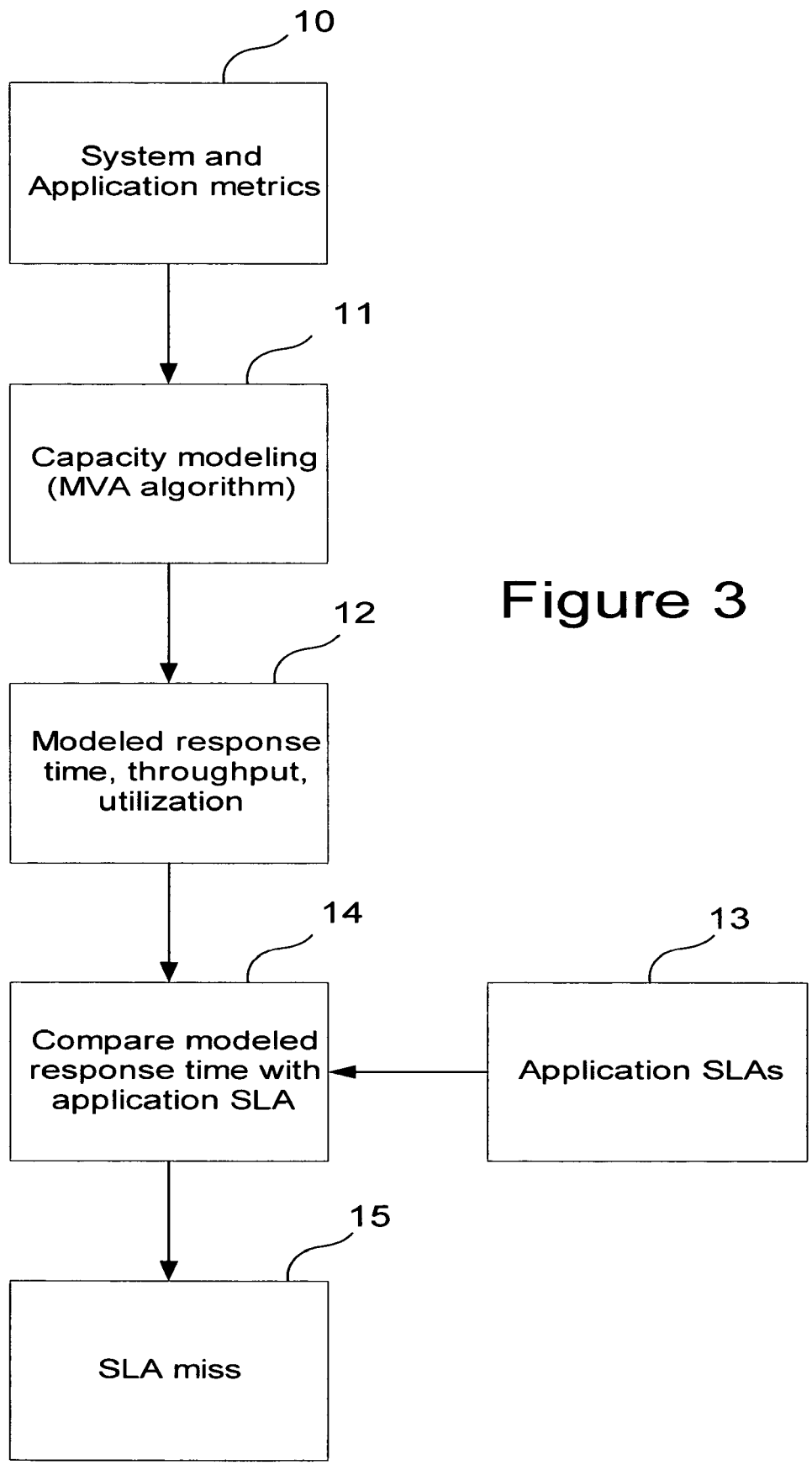
FIG. 3 is a flowchart illustrating the processes followed by the load balancer.

Referring to FIG. 1, a computer system 1 includes a number of servers 2, 3, 4 etc. Incoming requests are distributed among the servers by a load balancer 5.

Each server 2-4 can be modelled schematically as shown in FIG. 2, and contains a number of server resources including a CPU 6, and disks 7.

Each application received by the load balancer comprises a series of processes. Each process is executed by utilising one or more of the server resources. It is assumed that any one process will only be utilising one of the server resources at any one time. Each resource includes a queue 8 for holding processes waiting to be executed.

Associated with each application is one or more Service Level Agreements (SLAs). In most cases the application will have only a single SLA which is the same for all servers. For example the SLA for the application may be R seconds i.e. the application must take less than or equal to R seconds for execution. However in rare cases the application may have different SLAs on different servers. For example one server may have a bigger memory cache than the others, or is itself faster, so may be expected to return responses faster than the other servers. In this case the SLA for that server will be shorter than for the other servers.

The load balancer 5 hosts a capacity planning engine computer program which is arranged to run the process illustrated in FIG. 3.

A request arrives (perhaps a web server request) which is forwarded to the load balancer 5 (which could be in hardware or software). Associated with the request is SLA data 13.

The load balancer 5 contacts an agent 20-22 on each server, and each agent quickly calculates (using queuing theory modeling) the modeled response time if the request is sent to that server.

Referring to FIG. 3, each agent 20-23 takes system and application metrics 10. The system metrics may be for example the number of servers, and the arrangement of resources for each server. The application metrics are described in more detail below. The agent then runs a Mean Value Analysis (MVA) algorithm 11 that outputs utilizations, response times and throughputs 12.

Suitable tools for capacity modeling include BMC Predict and the Teamquest tool. A good overview of capacity modeling generally ("How to do Capacity Planning") is available at teamquest.com/pdfs/whitepaper/tqwp23.pdf. Further information is also available at teamquestcom/resources/cpwhitepapers.shtml and in the paper "Web Transaction Analysis and Optimization (TAO)" by Pankaj K. Garg et al, available online at hpl.hp.com/techreports/2002/HPL-2002-45.pdf.

The system and application metrics 10 are gathered by HP OpenView Performance agent. The application metrics include the parameters Alive Population, Active Population, and Completed Population, as defined below.

Each agent monitors its respective server over a measurement interval which is referred to below as the parameter Measurement Interval. In case of the OpenView performance tools, the measurement interval for process metrics is one minute and for other metrics is five minutes. During this interval, some processes will be created and some will be completed. Thus at any time during the measurement interval there will be a number of processes which are alive, that is they have been created but not yet completed. Say, at the start of the interval there may be 20 alive processes, during the interval 20 more are created and 10 are completed. So at the end of the hour there are 30 alive processes and 10 processes have been completed. The parameter Alive Population is the sum of the ratio alive-process-time/Measurement Interval for every process belonging to a given application, where alive-process-time is a parameter indicating the amount of time during the measurement interval in which the process is alive. The parameter Active Population is the sum of the ratio active-process-time/Measurement Interval for every process belonging to a given application, where active-process-time is a parameter indicating the amount of time during the measurement interval in which the process is consuming server resources. For example Active Population may have a value of 20.

The parameter Completed Population is defined as the total number of processes that completed during the measurement interval.

Table 1 below illustrates a four second interval for two processes, A & B, for an application.

TABLE 1

|  | Time (seconds) | | | |
| --- | --- | --- | --- | --- |
|  | 1 | 2 | 3 | 4 |
| Process A | Alive | Alive | Alive | Alive |
| Process B | Alive/CPU | Alive/CPU | Alive | Dead |

Process A is alive for the entire four second interval but consumes no resources. A's contribution to Alive Population is 4*¼. A contributes 0*¼ to Active Population. B's contribution to Alive Population is 3*¼. B contributes 2*¼ to Active Population. Thus, for this interval, Active Population is 0.5 and Alive Population is 1.75. Because a process may be alive but not active, Active Population will always be less than or equal to Alive Population.

The parameter Completed Population for the measurement interval of Table 1 is 1 since process B died in the last second of the interval.

The measured response time is calculated from the performance metrics directly as follows:

1. Calculate the measured throughput of an application as:
   Measured Throughput=(Active Population+Completed Population)/Measurement Interval
2. Measured Response Time=Active Population/Measured Throughput The parameter Modeled Response Time is calculated by performing MVA modeling on the basis of the system and application metrics 10. The application metrics include the parameters Alive Population, Active Population, and Completed Population as defined above, for each application currently being handled by the system. The metrics also include a parameter Application Service Demand which indicates the demand of a particular application. As part of the modeling process, a parameter Average Queue Length is calculated. This is the queue length averaged over all server resources and all applications for the measurement interval. For each application, a parameter Modeled Response Time can be calculated as Modeled Response Time=Application Service Demand* (1+Average Queue Length).

The parameter Modeled Response Time is essentially the time to service all the applications in the queue+the time taken to service the current application.

The modeled throughput can then be calculated as Active Population/Modeled Response Time.

After modeling, models are usually calibrated (by introducing suitable delays) to make Modeled Response Time close to Measured Response Time.

The load balancer 5 calculates the parameter SLA miss, in step 14 of FIG. 3, and outputs at step 15. SLA miss is defined as:

$$SLA\ miss = \text{Defined } SLA - \text{Modeled response time}$$

The load balancer 5 forwards the request to the server whose performance would be least affected (i.e. the server with the highest value of SLA miss). A positive SLA miss means SLA will not be affected; a negative one means it will be affected in which case the request is forwarded to the one with the least negative value of SLA miss.

The invention is described above in the context of a load balancer. However the invention may also be implemented in the following systems.

In a first alternative example the invention may be implemented in cluster software that migrates processes based on load. Migration involves moving a process to a different cluster node when the load on a node goes up. The load could be computed from simple metrics (such as CPU utilization) or in a more complex way (using capacity modeling). OpenSSI uses technology from the MOSIX project to perform load leveling (see samag.com/documents/s=8817/sam0313a./0313a.htm for an overview). The process is stopped on the current node and restarted from the next instruction on a different node (decided by the load leveler).

Load balancing mechanisms can be implemented for cluster nodes if they run horizontally scaling applications (applications that can be scaled by creating more instance of the application/server such as a web server). For example, in HP's OpenSSI cluster (openssi.org/) is integrated with the Linux Virtual Server (LVS) to load balance web servers in the cluster. HP's OpenSSI software migrates processes from one cluster node to another based on a simple notion of load (the run queue length on the cluster node). Better migration decisions can be taken if load balancing is done with capacity evaluation inputs.

In a second alternative example. the invention may be implemented in a computational grid in which servers loan free CPU cycles. How many cycles to loan is a tricky decision. The decision could be made on the basis of analytical modeling.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

What is claimed is:

1. A method comprising:
   determining, for each of a plurality of system resources, a modeled response time for a given load, wherein the modeled response time is calculated using an application service demand multiplied by a sum of 1 and an average queue length, wherein the application service demand comprises the demand of a particular application executing on each of the plurality of system resources and the average queue length is a queue length averaged over all the plurality of system resources and applications;
   determining, for each of the system resources, a Service Level Agreement (SLA) miss value by subtracting the modeled response time of each of the system resources for a given load from a predetermined SLA of each of the system resources; and
   distributing said load to the system resource having the greatest SLA miss value.

2. A method according to claim 1 wherein determining the modeled response time further comprises determining the modeled response time by analytical modeling using a queuing network model.

3. A method according to claim 1 wherein each system resource is a server including a central processing unit and one or more storage devices.

4. A method according to claim 1 including receiving a request associated with the given load.

5. A method according to claim 4 wherein the request is a web server request.

6. A method according to claim 1 wherein the load is distributed in accordance with a single Service Level Agreement (SLA) which is the same for all system resources.

7. A method according to claim 1 wherein distributing further comprises distributing the load in accordance with a first Service Level Agreement (SLA) associated with a first one of the system resources and a second Service Level Agreement (SLA) associated with a second one of the system resources.

8. A method according to claim 1 wherein the load is distributed to the system resource by stopping a process on one of the system resources and migrating the process to a different system resource.

9. A method according to claim 1 further including monitoring each system resource over a measurement interval to generate a measured response time, and calibrating each modeled response time in accordance with a respective measured response time.

10. A method according to claim 1 further including monitoring each system resource to generate one or more application metrics, and modeling the response time in accordance with the one or more application metrics.

11. A method according to claim 10 wherein the one or more application metrics include a parameter indicating the amount of time during a measurement interval in which a process is alive.

12. A method according to claim 10 wherein the one or more application metrics include a parameter indicating the amount of time during a measurement interval in which a process is consuming resources.

13. A method according to claim 10 wherein the one or more application metrics include a parameter indicating the number of processes that completed during a measurement interval.

14. A computer system including:
   a processor configured to execute a load distributor;
   two or more system resources; and
   two or more agents, each agent configured to model a response time of the system resources for a given load, wherein the modeled response time is calculated using an application service demand multiplied by a sum of 1 and an average queue length, wherein the application service demand comprises the demand of a particular application executing on each of the plurality of system resources and the average queue length is a queue length averaged over all the plurality of system resources and applications;
   wherein the load distributor is configured to:
      receive the modeled response time of each of the system resources from the agents;
      determine, for each of the system resources, a Service Level Agreement (SLA) miss value by subtracting the response time of each of the system resources for a given load from a predetermined SLA of each of the system resources; and
      distribute said load to the system resource having the greatest SLA miss value.

15. A non-transitory computer-readable storage medium comprising software that, when executed by a processor, causes the processor to:

determine, for each of a plurality of resources, a modeled response time for a given load, wherein the modeled response time is calculated using an application service demand multiplied by a sum of 1 and an average queue length, wherein the application service demand comprises the demand of a particular application executing on each of the plurality of system resources and the average queue length is a queue length averaged over all the plurality of system resources and applications;

determine, for each of the resources, a Service Level Agreement (SLA) miss value by subtracting the modeled response time of each of the resources for a given load from a predetermines SLA of each of the resources; and distribute said load to the one of the resources having the greatest SLA miss value.

16. A method comprising:

determining, for each of a plurality of system resources, a modeled response time for a given load, wherein the modeled response time is calculated using an application service demand multiplied by a sum of 1 and an average queue length, wherein the application service demand comprises the demand of a particular application executing on each of the plurality of system resources and the average queue length is a queue length averaged over, all the plurality of system resources and applications;

distributing the load to the system resource with the lowest modeled response time.

* * * * *

UNITED STATES PATENT AND TRADEMARK OFFICE
CERTIFICATE OF CORRECTION

| | | |
|---|---|---|
| PATENT NO. | : 7,962,916 B2 | Page 1 of 1 |
| APPLICATION NO. | : 11/098830 | |
| DATED | : June 14, 2011 | |
| INVENTOR(S) | : Krishnan Ramanathan | |

It is certified that error appears in the above-identified patent and that said Letters Patent is hereby corrected as shown below:

In column 8, line 10, in Claim 16, delete "over," and insert -- over --, therefor.

Signed and Sealed this
Twentieth Day of December, 2011

David J. Kappos
*Director of the United States Patent and Trademark Office*